United States Patent [19]

Fukuda et al.

[11] 4,215,251
[45] Jul. 29, 1980

[54] SWITCHING APPARATUS SELECTIVELY UTILIZING A REGENERATIVE REPEATER

[75] Inventors: Takeo Fukuda; Kazuhiko Hanawa, both of Yokohama; Kiyoshi Urui, Tokyo, all of Japan

[73] Assignee: Tokyo Shibaura Electric Co., Ltd., Kawasaki, Japan

[21] Appl. No.: 934,850

[22] Filed: Aug. 18, 1978

Related U.S. Application Data

[63] Continuation-in-part of Ser. No. 768,428, Feb. 14, 1977, abandoned.

[30] Foreign Application Priority Data

Feb. 16, 1976 [JP] Japan ................................. 51/14958

[51] Int. Cl.² ............................................. H04B 3/36
[52] U.S. Cl. ......................... 179/170 R; 179/16 EA; 179/16 F; 179/18 GD
[58] Field of Search ............ 179/16 R, 16 A, 16 AA, 179/16 E, 16 EA, 16 EC, 16 F, 170 R, 84 VF, 18 GF, 18 GD; 328/164; 178/63 A, 71 R, 71 N

[56] References Cited

U.S. PATENT DOCUMENTS

| | | |
|---|---|---|
| 3,288,940 | 11/1966 | Bennett et al. ................... 179/84 VF |
| 3,403,228 | 9/1968 | Zebe .................................... 179/16 F |
| 3,493,686 | 2/1970 | Spittler et al. ...................... 179/16 F |
| 3,806,658 | 4/1974 | Anderson et al. .................. 179/16 F |
| 3,816,668 | 6/1974 | Giesken .............................. 179/16 F |
| 3,819,867 | 6/1974 | McCarthy et al. ............. 179/18 GF |
| 4,004,105 | 1/1977 | Mizukoshi ........................ 179/84 VF |
| 4,057,695 | 11/1977 | Ohno ............................... 179/170 R |

Primary Examiner—Terrell W. Fears
Assistant Examiner—Randall P. Myers
Attorney, Agent, or Firm—Oblon, Fisher, Spivak, McClelland & Maier

[57] ABSTRACT

A switching apparatus comprising a switching circuit provided with a plurality of input terminals and a plurality of output terminals; a plurality of regenerative repeaters connected between the prescribed ones of said plural input and output terminals, the number of the regenerative repeaters being less than that of circuits through which signals of high error rate are expected to pass; and means for conducting signals from the prescribed input terminals to the output terminals directly or through the regenerative repeaters.

5 Claims, 13 Drawing Figures

F I G. 4
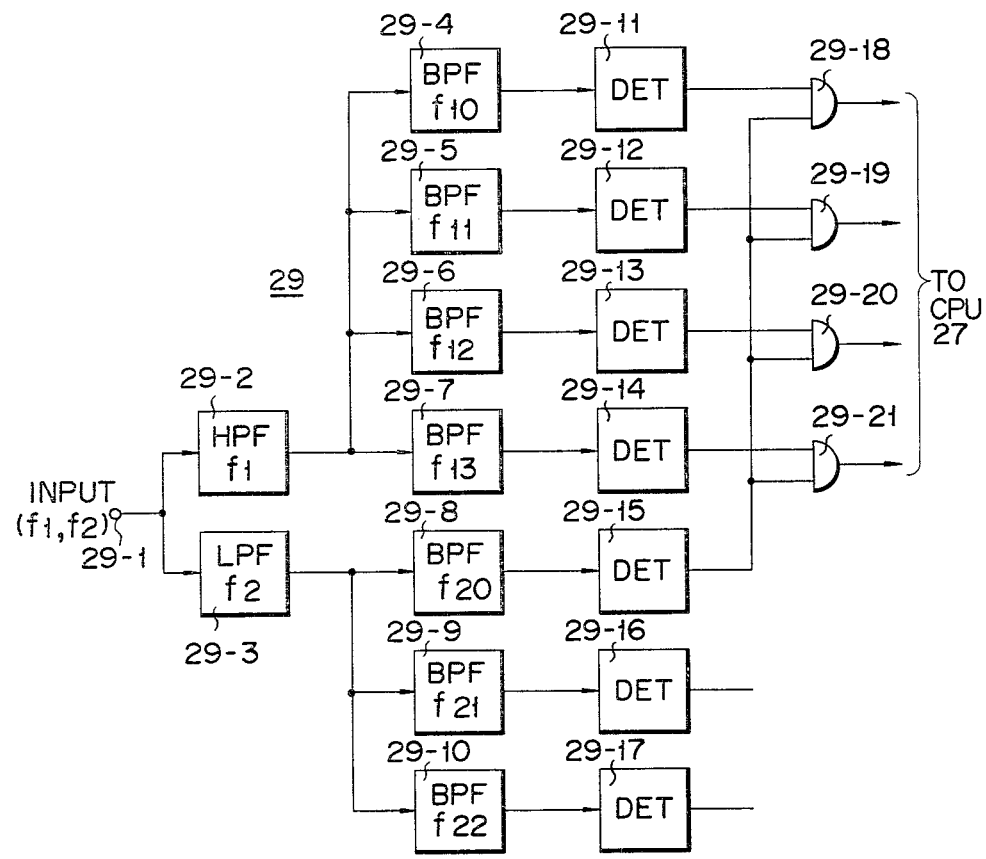

F I G. 6
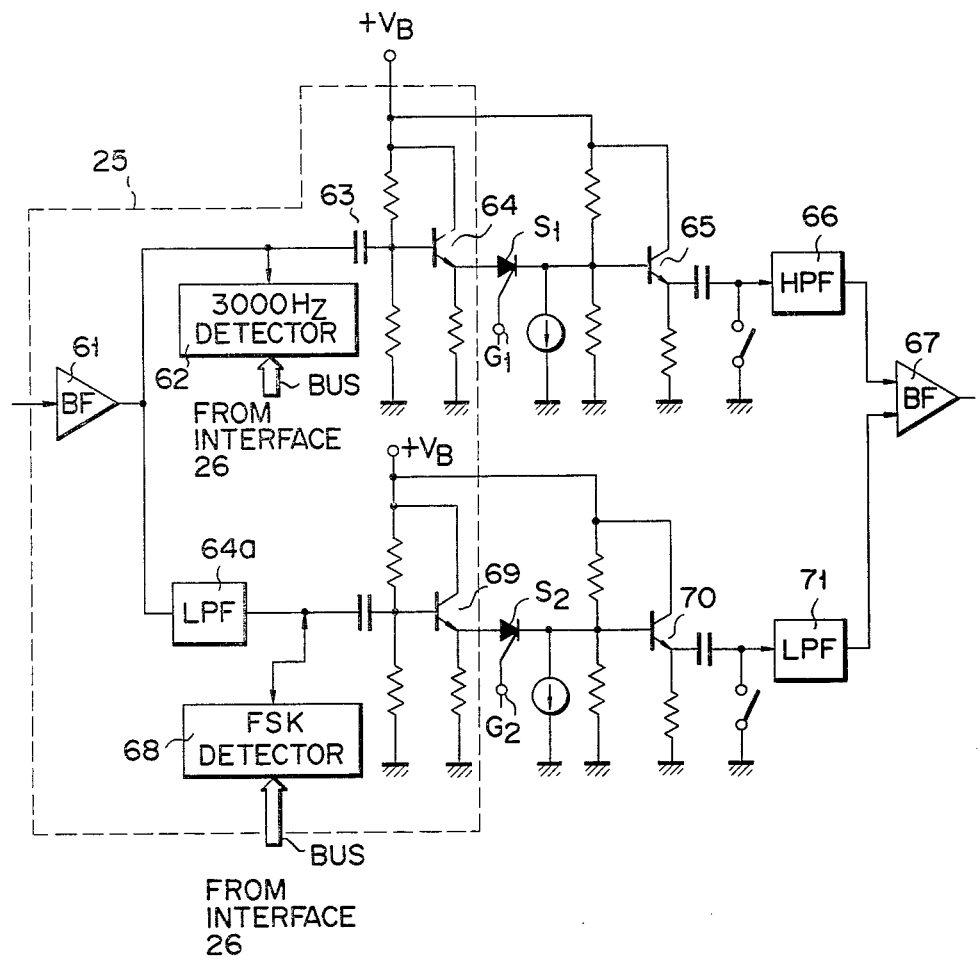

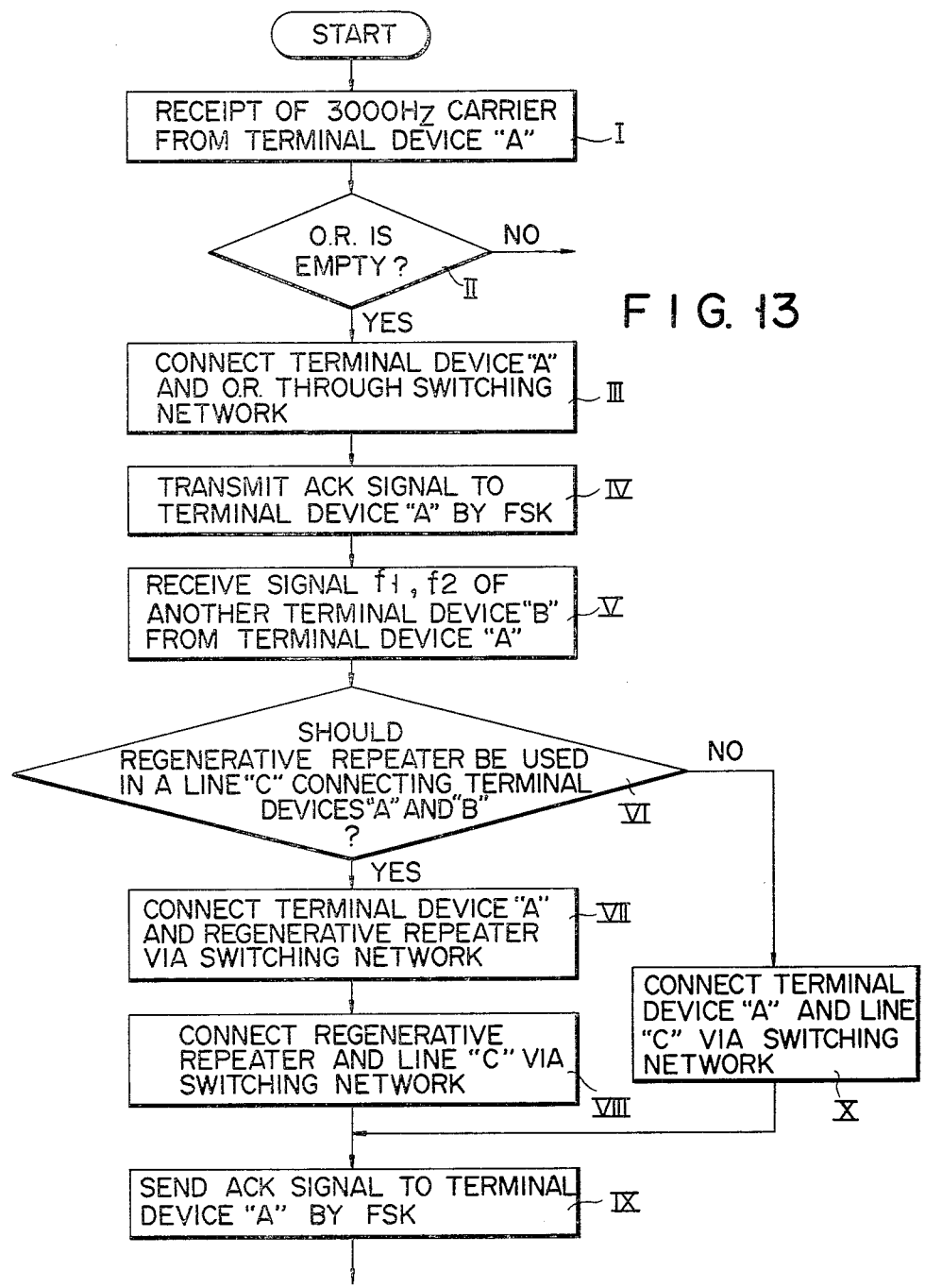

SWITCHING APPARATUS SELECTIVELY UTILIZING A REGENERATIVE REPEATER

CROSS REFERENCE TO THE RELATED APPLICATION

This application is a continuation-in-part of copending application Ser. No. 768,428 filed Feb. 14, 1977, now abandoned.

BACKGROUND OF THE INVENTION

This invention relates to a switching apparatus arranged for effective utilization of a regenerative repeater.

The switching apparatus is used to transmit voice signals, data signals and facsimile signals by selectively connecting a plurality of terminal devices. For transmission and reception of these signals, it has been demanded to shorten a length of time required for transmission of signals. To this end, there has been developed a modulation-demodulation device used, for example, with a voice band circuit which is operated at the signaling speed of 9600 bauds per second. However, the higher the transmission speed, the more noticeable the rate of data errors. This data error rate is largely affected by the quality of lines through which the signals are transmitted. Hitherto, the following processes have been adopted to keep the data error rate within an allowable limit. The usual upper limit of this error rate is, for example, $10^{-5}$. A first process is to lower a transmission rate to such extent that the data error rate can be reduced to a lower level than allowed even when a transmission line has the worst data error rate. However, this process goes contrary to the demand to accelerate transmission speed and is practically unacceptable. A second process is to connect a regenerative repeater to all output or outgoing circuits of the respective switching apparatus through which high error rate signals are expected to pass. This process connects a regenerative repeater to all outgoing circuits of the respective switching apparatus, at least a regenerative repeater is wasted when at least two regenerative repeaters are connected in a transmission path. Moreover, the regenerative repeater is generally costly to render the switching apparatus of the second process extremely expensive. Since it is rarely that all circuits of high error rate of signals are in use, the use of the expensive regenerative repeaters makes the switching apparatus very expensive.

SUMMARY OF THE INVENTION

It is accordingly the object of this invention to provide a relatively inexpensive switching apparatus which admits of very effective utilization of a regenerative repeater, attains a high transmission speed and controls a data error rate to a low level.

To this end, the switching apparatus of the invention is characterized in that a plurality of regenerative repeaters are connected between some of a plurality of input terminals and output terminals of a switching circuit the number of the regenerative repeaters being less than that of circuits through which signals of high error rate are expected to pass; and, only when a circuit which affects the signal to have a high error rate is to be used, terminal devices are connected by allowing said signal to pass through the selected one of the regenerative repeaters.

BRIEF DESCRIPTION OF THE DRAWING

FIG. 4 is a block circuit diagram of an originating register of FIG. 2;

FIG. 6 shows a concrete arrangement of the line circuit and switching circuit of FIG. 5;

FIGS. 11, 12 and 13 are flow charts showing the operation the circuit of FIG. 7.

DETAILED DESCRIPTION OF THE INVENTION

Figure 1:
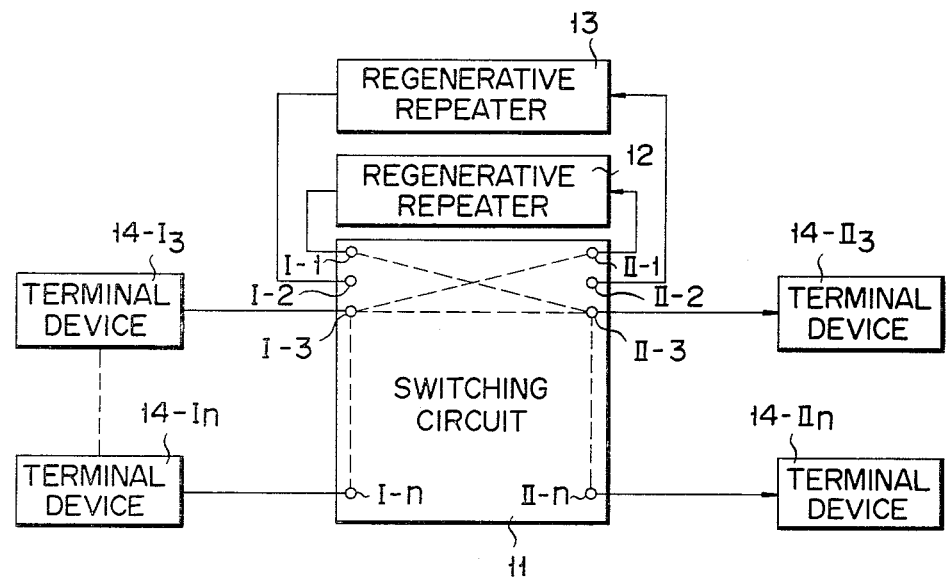
FIG. 1 is a block circuit diagram showing the principle by which the switching apparatus of this invention is operated.

There will now be described by reference to FIG. 1 the principle by which the switching apparatus of this invention is operated. A switching circuit 11 has a plurality of input terminals I-1 to I-n and a plurality of output terminals II-1 to II-n. Regenerative repeaters 12, 13 are connected between the input terminals and output terminals of the switching circuit 11 as between I-1 and II-1 and between I-2 and II-2 respectively. The remaining input terminals I-3 to I-n are connected to terminal devices 14-I3 to 14-In and the remaining output terminals II-3 to II-n are connected to terminal devices 14-II3 to 14-IIn.

Where, a signal is transmitted through a good quality line of low error rate, for example, between the terminal devices 14-I3 and 14-II3, then the input terminal I-3 of the switching circuit 11 is directly connected to the output terminal II-3. Where a signal is transmitted through a low quality line of high error rate, the input terminal I-3 is connected to, for example, the output terminal II-1, and the input terminal I-1 is connected to the output terminal II-3. Thus the terminal device 14-I3 is connected to the terminal device 14-II3 through the regenerative repeater 12. The signal of high error rate thus transmitted has its error rate corrected while conducted through the regenerative repeater 12.

The error rate is measured by transmitting data through a line connected between one of the terminals of the switching circuit 11 and a terminal device by means of a well known error rate measuring apparatus. If the measured error rate is more than $10^{-5}$, it is said in this specification that the quality of the data is poor. If the line with the error rate of more than $10^{-5}$ is to be used, a regenerative repeater has to be used to improve the quality of the data. An error rate of each of the lines to be connected between a terminal device and the switching circuit 11 is measured by using the known error rate measuring apparatus. If the measured error rate is more than $10^{-5}$ a binary signal "1" is referred to, and if the error rate is less than $10^{-5}$ a binary signal "0" is referred to for lines of No. 1 to No. 8. The binary signals "1" and "0" are stored at RAM addresses RAM0 to RAM7 of a random access memory (RAM) as shown in TABLE I below.

Table I

| RAM ADDRESS | RAM | LINE NO. |
|---|---|---|
| RAM 0 | "1" | 1 |
| RAM 1 | "0" | 2 |
| RAM 2 | "0" | 3 |
| RAM 3 | "1" | 4 |
| RAM 4 | "1" | 5 |
| RAM 5 | "0" | 6 |
| RAM 6 | "0" | 7 |
| RAM 7 | "1" | 8 |

In the case of the Table I, lines of No. 1, No. 4, No. 5, and No. 8 should be used together with a regenerative repeater.

As mentioned above, the switching apparatus of this invention is characterized in that regenerative repeaters are connected between some of a plurality of input terminals and output terminals of the switching circuit 11 and, only upon receipt of a signal of high error rate, terminal devices are connected through the selected one of the regenerative repeaters. Therefore, the present invention provides a relatively inexpensive switching apparatus which admits of very effective utilization of a regenerative repeater, attains a high transmission speed and controls a data error rate a low level.

Figure 2:
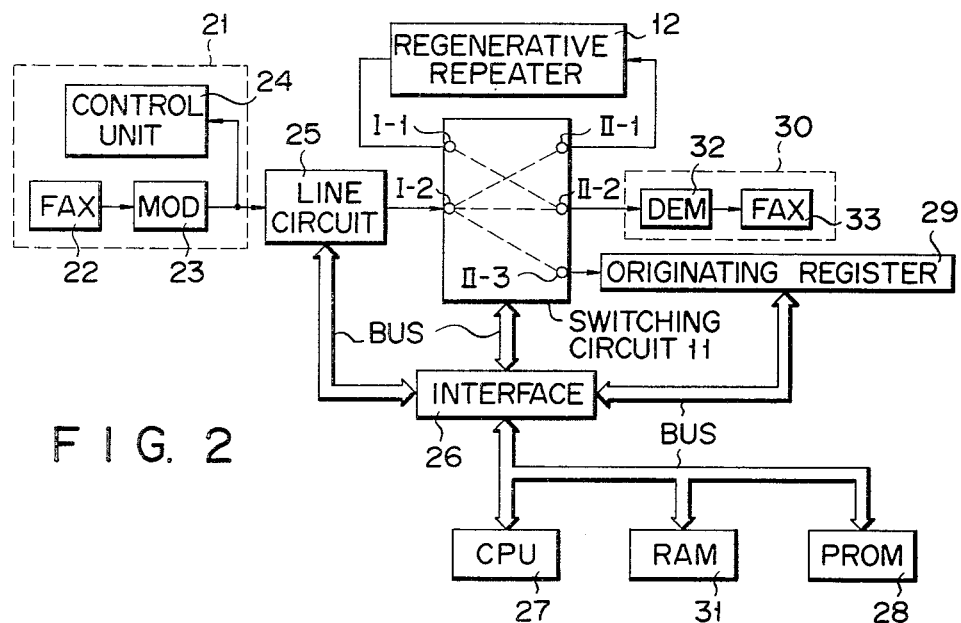
FIG. 2 is a block circuit diagram of a switching apparatus of the invention when applied to a facsimile signal transmission and reception system.

There will now be described by reference to FIG. 2 the operation of a facsimile signal transmitting and receiving system. FIG. 2 only indicates a single circuit having two terminal devices for better understanding. In practice, however, a large number of circuits having many terminal devices are used. Referring to FIG. 2, a transmission side terminal device 21 indicated by a broken line block comprises a fascimile signal transmitter (FAX) 22, a modulator (MOD) 23 for modulating a carrier signal by a facsimile signal issued from the facsimile signal transmitter (FAX) 22 and a circuit control unit 24. Outputs from the modulator (MOD) 23 and circuit control unit 24 are supplied to a line circuit 25. When an original paper is set to the terminal device 21, an initiation signal sent forth from the circuit control unit 24 is delivered to a CPU 27 through the line circuit 25, BUS and interface 26 in turn. The CPU 27 supplies an acknowledgement (ACK) signal to the circuit control unit 24 in accordance with a program stored in a programmable read-only memory (PROM) 28 upon receipt of a terminal device-designating signal from the circuit control unit 24 through the interface 26 and line circuit 25 and also issues a switching instruction to the switching circuit 11 to connect together the input terminal I-2 and output terminal II-3 thereof.

Figure 3:
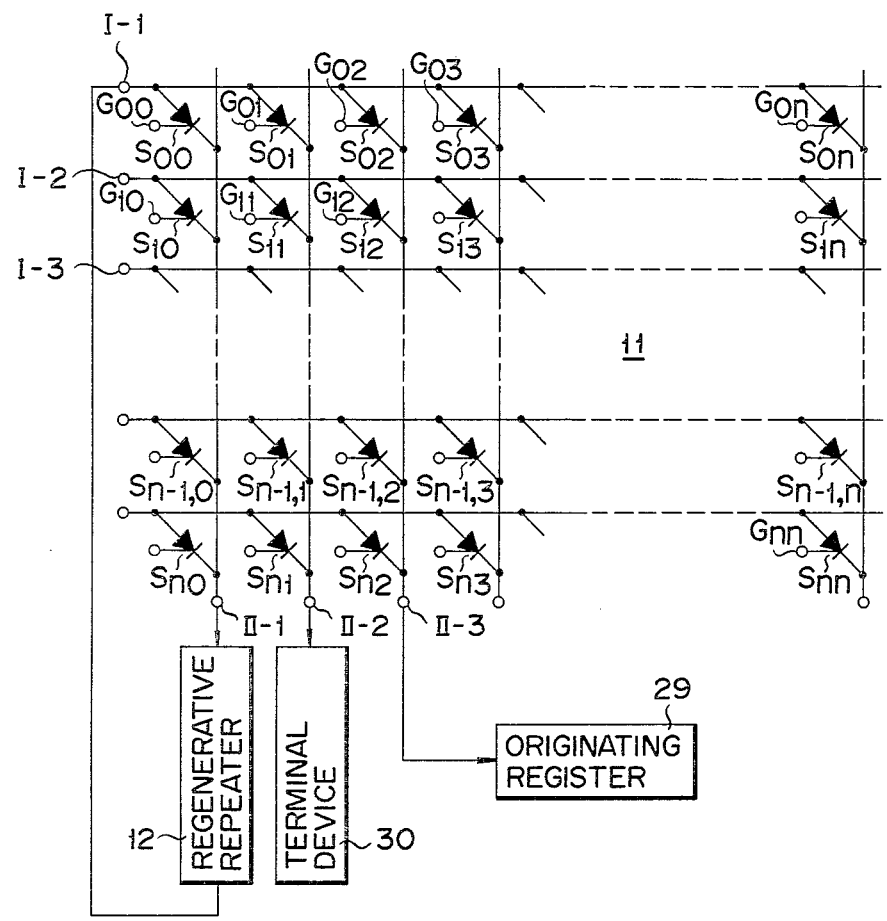
FIG. 3 shows a concrete matrix arrangement of a switching circuit section of FIG. 2.

The switching circuit 11 as shown in FIGS. 2 and 3 is a matrix circuit formed by arranging a plurality of semiconductor-controlled rectifiers (SCR) S00, S01 to Snn at the matrix junctions. The ON-OFF operation of these rectifiers S00 to Snn is controlled by supplying a gate signal from a gate control circuit (not shown) to the corresponding gate terminals G00 to Gnn. Connection of the input terminal I-2 to the output terminal II-3, for example, is carried out by supplying a gate signal to the gate terminal G12 of the rectifier S12.

When receiving an ACK signal from the CPU 27 with the input and output terminals I-2, II-3 of the switching circuit 11 connected together, the circuit control unit 24 sends forth a terminal device-designating signal. This terminal device-designating signal is conducted to an originating register 29 connected to the output terminal II-3. The originating register 29 interprets the contents of said terminal device-designating signal and detects a number allotted to the receiving side terminal device 30 being called.

A terminal device-designating signal delivered from the circuit control unit 24 is formed of a combination of, for example, two high and low frequency bands f1, f2. Where the high frequency band f1 includes four frequency components f10, f11, f12, f13, and the low frequency band is formed of three frequency components f20, f21, f22, then it is possible to indicate, as shown in Table II below, ten digits of 0 to 9 and notation #, *, that is, twelve datas.

Table II

| f1 | f2 | | |
|---|---|---|---|
| | f20 | f21 | f22 |
| f10 | 1 | 2 | 3 |
| f11 | 4 | 5 | 6 |
| f12 | 7 | 8 | 9 |
| f13 | # | 0 | * |

Where a number of 4 is allotted to the receiving side terminal device 30, then the circuit control unit 24 supplies the originating register 29 with a number formed of a high frequency component f11 combined with a low frequency component f20 as a terminal device-designating signal. Accordingly, the originating register 29 should be so designed as to interpret the meaning of a combination of two frequency components for detection of a number allotted to a terminal device being called.

FIG. 4 shows a concrete arrangement of the originating register 29. A terminal device-designating signal (f1-f2) supplied to an input terminal 29-1 is conducted to a highpass filter 29-2 and low-pass filter 29-3. At this time, the high frequency band f1 and low frequency band f2 of said terminal device-designating signal are extracted. The high frequency band is carried to bandpass filters 29-4, 29-5, 29-6, 29-7 having central frequencies f10, f11, f12, f13. The low frequency band is conducted to band-pass filters 29-8, 29-9, 29-10 having central frequencies f20, f21, f22. Outputs from the band-pass filters 29-4 to 29-10 are detected by the corresponding detectors 29-11 to 29-17. The one side input terminals of AND gates 29-18, 29-19, 29-20, 29-21 are supplied with wave detection outputs f10 to f13 delivered from the detectors 29-11 to 29-14. The other side input terminals of said AND gates are supplied with a wave detection output f20 sent forth from the detector 29-15. In practice, the AND gates are provided in a number corresponding to as many combinations as can be formed by the frequency components included in the high and low frequency bands f1, f2. For briefness of representation, however, only some of said AND gates are indicated in FIG. 4.

Where a terminal device-designating signal delivered from the circuit control unit 24 has high and low frequency bands f11, f20, then outputs from the band-pass filter 29-5, 29-8 are supplied to the AND gate 29-19 through the detectors 29-12, 29-15. The AND gate 29-19 generates an output denoting a number of 4.

A data on the detected number of 4 is fed back from the originating register 29 of FIG. 2 to the CPU 27 through the bus and interface 26. The CPU 27 collates a number data thus received with a data previously stored in a random access memory (RAM) 31 and determines whether the regenerative repeater 12 should be used, according to the data error rate of a line through which the signals are transmitted. Based on said determination, the CPU 27 sends forth a switching instruction to the switching circuit 11 through the bus and interface 26, and also a data transmission instruction to the circuit control unit 24 through the line circuit 25. Where an input signal has a good quality or an error rate of less than $10^{-5}$, the CPU 27 supplies the switching circuit 11 with an instruction to directly connect together the input terminal I-2 and output terminal II-2. Upon receipt of said instruction, a gate signal is delivered to the gate G11 of the SCR S11 to render said SCR S11 operative with the resultant connection between the input terminal I-2 and output terminal II-2. As the result, a modulated facsimile signal is sent forth from the transmission side terminal device 21 to the receiving side terminal device 30. The modulated facsimile signal conducted to the receiving side terminal device 30 is demodulated by a demodulator 32 to eliminate a carrier component. A proper facsimile signal thus obtained is supplied to a facsimile receiver 33.

Where a signal delivered from the transmission side terminal device 21 has a low quality or an error rate of more than $10^{-5}$, the input terminal I-2 and output terminal II-1 of the switching circuit 11 and the input terminal I-1 and output terminal II-2 thereof are connected together respectively upon receipt of a switching instruction from the CPU 27. As the result, the modulated facsimile signal is supplied from the line circuit 25 to the receiving side terminal device 30 through the regenerative repeater 12. The input terminal I-2 is connected to the output terminal II-1 by operating the SCR S10 of FIG. 3. The input terminal I-1 is connected to the output terminal II-2 by actuating the SCR S01.

Figure 5:
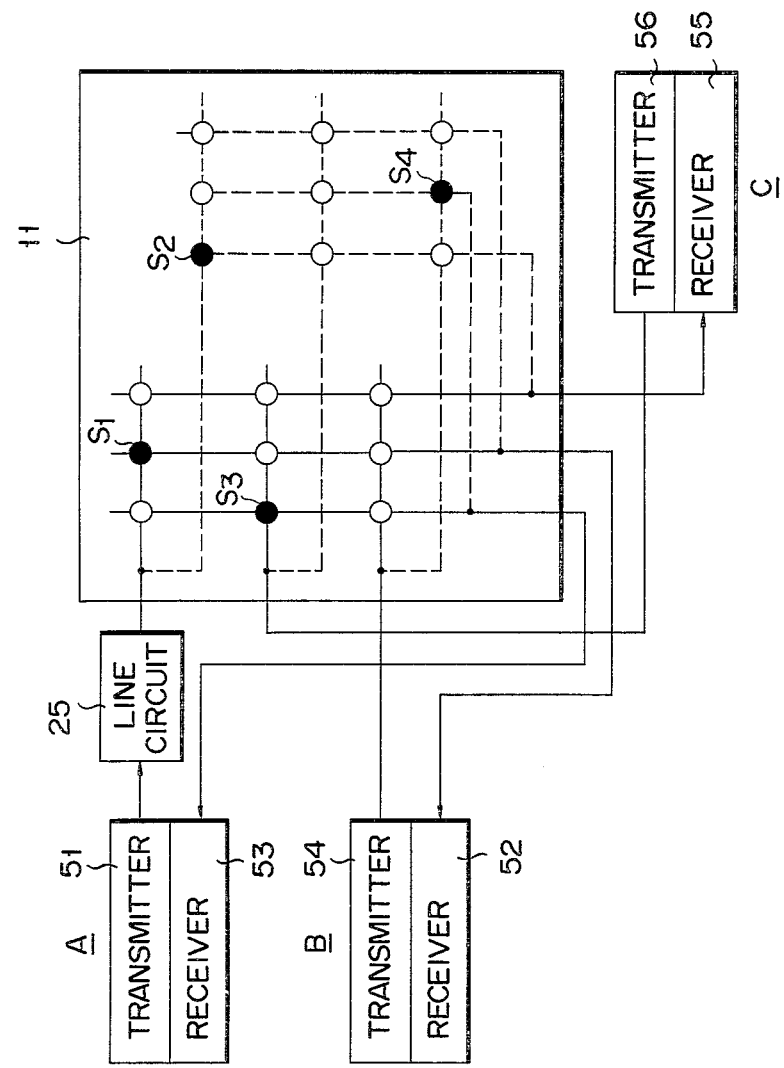
FIG. 5 is a block circuit diagram of the main part of the switching apparatus of the invention when applied to a multidirectional double communication system.

There will now be described by reference to FIG. 5 a switching apparatus according to another embodiment of this invention. This embodiment relates to a multidirectional double communication system which is provided with transmission and reception devices. This multidirectional double communication system is the type which transmits data at a high frequency band of, for example, 600 to 3400 Hz and a control signal at a low frequency band of, for example, 300 to 600 Hz. Where, in FIG. 5, data is transmitted from a terminal device A to a terminal device B through a line circuit 25, a switch S1 of the switching circuit 11 is rendered conducting. The above-mentioned high frequency data is delivered from a transmitter 51 of the terminal device "A" to a receiver 52 of the terminal device "B" through the switch S1 enclosed in a solid line block of the switching circuit 11 and indicated by a black circle. A response signal of the device "B" is carried from the transmitter 54 to the receiver 53 of the device "A" through a switch S4. Whereas, the receiver 53 of the terminal device "A" receives the data from a transmitter 56 of the terminal device "C" through a switch S3, and a response signal or the low frequency control signal of the device "A" is carried from the transmitter 51 to the receiver 55 of the terminal device "C" through an actuated switch S2 enclosed in a broken line block of the switching circuit 11 and indicated by a black circle. Thus, the data can be transmitted between the terminal devices "A" and "B" and also can be transmitted between the terminal devices "A" and "C".

Where the transmitter 51 issues a carrier signal of, for example, 3000 Hz, detector included in the line circuit 25 detects said carrier signal, causing the transmitter 51 to be connected to an originating register 29 arranged as shown in FIG. 4. As the result, the CPU 27 sends forth an ACK signal to the transmitter 51. Upon receipt of the ACK signal, the circuit control unit 24 of the transmitter 51 delivers a terminal device-designating signal to the originating register 29. Upon receipt of the terminal device-designating signal, the originating register 29 detects that a terminal device to which a data is to be supplied is "B", and in consequence examines whether it is necessary to use a regenerative repeater for connection of the terminal devices "A", "B". If a data error rate of a line to be connected between terminal devices "A" and "B" is larger than $10^{-5}$, a regenerative repeater is connected to the circuit as in FIG. 2.

FIG. 6 indicates a part of the concrete arrangement of the line circuit 25 and switching circuit 11. An input signal formed of a mixture of a data supplied from the transmitter 51 and a control signal or an FSK signal is conducted to the base of a transistor 64 through a buffer 61, 3000 Hz detector 62 and capacitor 63 in turn, and also to a low-pass filter 64a. In FIG. 6, a block enclosed in broken lines denotes a line circuit 25.

When the 3000 Hz detector 62 detects a 3000 Hz carrier signal, then a gate signal is supplied to the gate terminal G1 of an SCR acting as a high frequency switch S1. The input signal is sent to a transistor 65 and then carried to a high-pass filter 66. A high frequency data component of the input signal filtered out of the high-pass filter 66 is drawn off through a buffer 67 and supplied to the receiver 52. An output from the low-pass filter 64a is delivered to an FSK detector 68 which detects a low frequency control signal component of the input signal. Upon said detection, a gate signal is supplied to a gate terminal G2 of an SCR acting as a low frequency switch S2 to render said switch S2 conducting. Accordingly, a low frequency signal sent forth from the low-pass filter 64a is conducted to a low-pass filter 71 through a transistor 69, switch S2 and transistor 70 in turn. The low-pass filter 71 only filters out a control signal component of a low frequency input signal. The control signal component thus filtered out is drawn off through the buffer 67 and sent forth to the receiver 55.

The conception of this invention can be applicable not only to an automatic switching system but also to an electronic switching system such as a time division electronic switching system.

Figure 7:
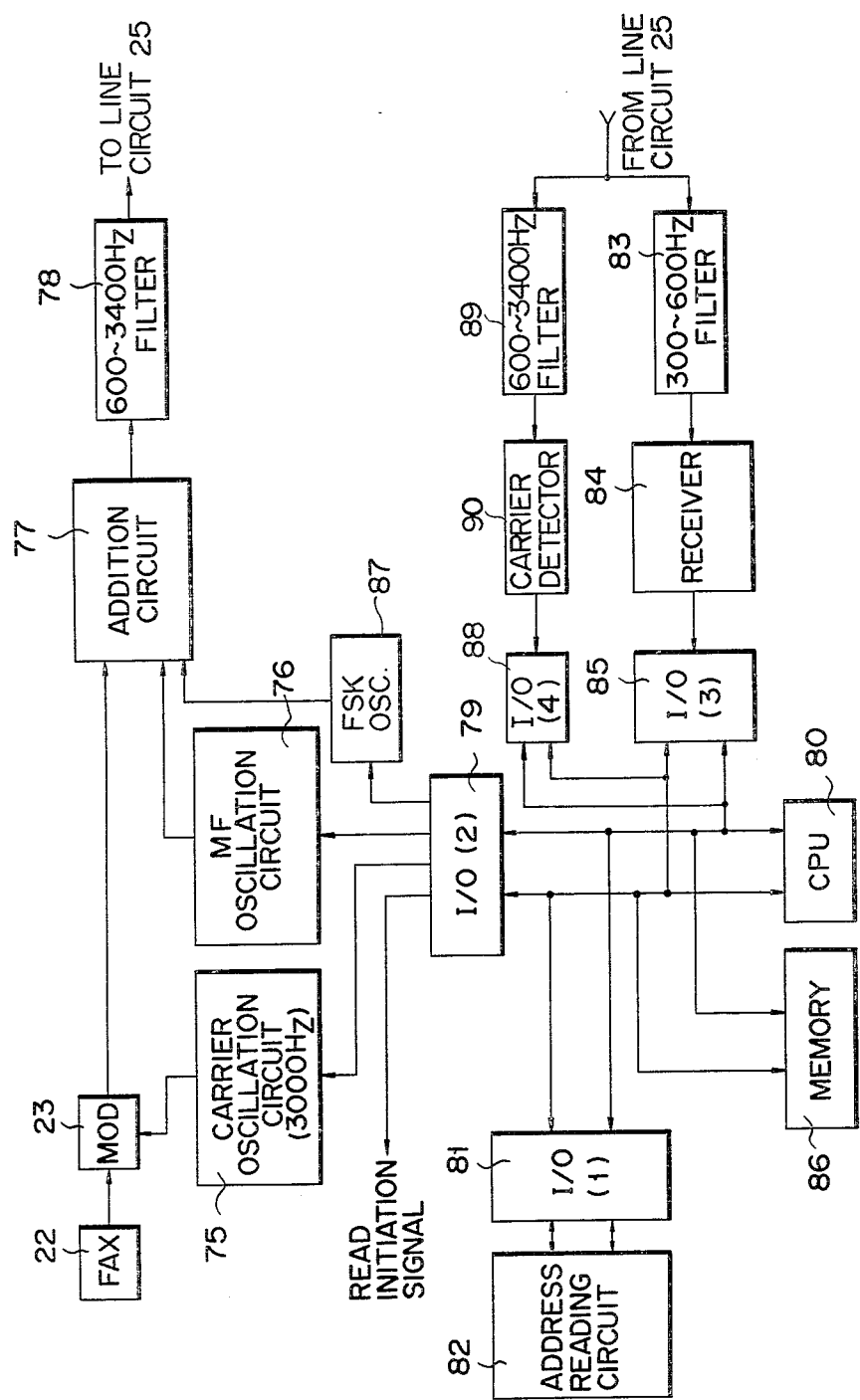
FIG. 7 shows a concrete arrangement of a terminal device of FIG. 2.

The control unit 24 shown in FIG. 2 is constituted such a manner as shown in FIG. 7. In FIG. 7, the carrier signal of 3000 Hz generated from a carrier oscillation circuit 75 is modulated by a facsimile signal obtained from the facsimile signal transmitter 22 by means of a modulator 23. The modulated carrier signal thus obtained is supplied to an addition circuit 77 together with an MF signal generated at a mixed frequency (MF) oscillation circuit 76 so as to be mixed with each other. The MF signal is an address signal or terminal device-designating signal constituted with two different frequency signals of f1 and f2.

Figure 8:
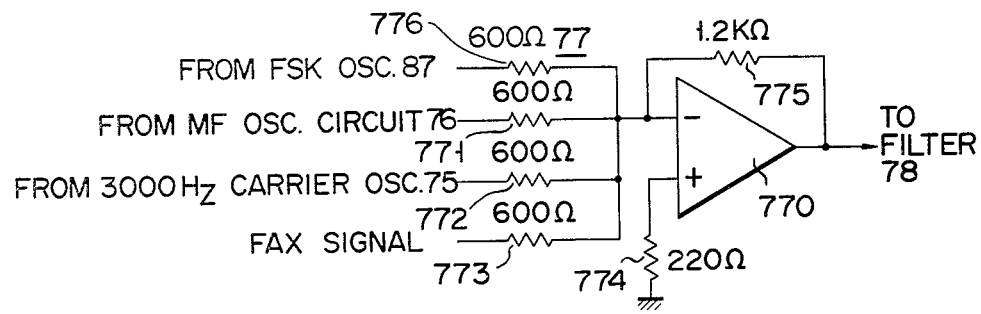
FIG. 8 is a circuit diagram of an addition circuit shown in FIG. 7.

The addition circuit 77 is formed of, for example, an operational amplifier 770 as shown in FIG. 8. In the FIG. 8, the MF signal, 3000 Hz carrier signal, facsimile signal and an FSK signal generated at an FSK oscillator 87 are respectively supplied to an inversion input terminal of the operational amplifier 770 through resistors 771, 772, 773 and 776 of 600 ohms. The non-inversion input terminal of the amplifier 770 is grounded through a resistor 774 of 220 ohms. The inversion input terminal and an output terminal of the operational amplifier 770 are coupled with each other through a resistor 775 of 1.2 kilo-ohms.

The Mixed signal obtained from the addition circuit 77 is sent forth through a 600 Hz–3400 Hz band-pass filter 78 to the line circuit 25. The oscillation circuits 75, 76 and 87 are driven by an output delivered from an I/O(2) device 79 controlled by a CPU 80. A read or transmission initiation signal for the facsimile signal is also delivered from the I/O(2) device 79. When the read initiation signal is delivered from the I/O(2) device 79, the transmission of the facsimile signal is initiated based upon an instruction from the CPU 80.

The FSK or response signal is sent forth to a filter 83 through the line circuit 25 from the switching circuit 11 in accordance with a signal transmitted to the line circuit 25 through the filter 78. The filter is a 300 Hz to 600 Hz band-pass filter and a response signal filtered out therefrom is conducted to a receiver 84.

As the CPU 27, RAM 31 shown in FIG. 2, the CPU 80, I/O devices 79, 81 and 85 shown in FIG. 7, well known components used in a microcomputer such as Zilog Z-80 which is a product of Zilog, Inc. USA, may be used. The detailed construction and operation of the components are explained in "Product Specification" published by Zilog, Inc., and further explanation thereof is omitted in this specification.

Figure 9:
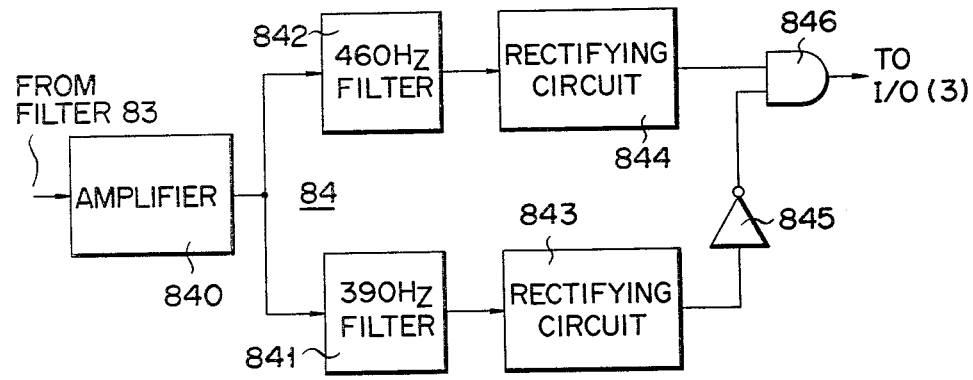
FIG. 9 is a block diagram of a receiver shown in FIG. 7.
Figure 10:
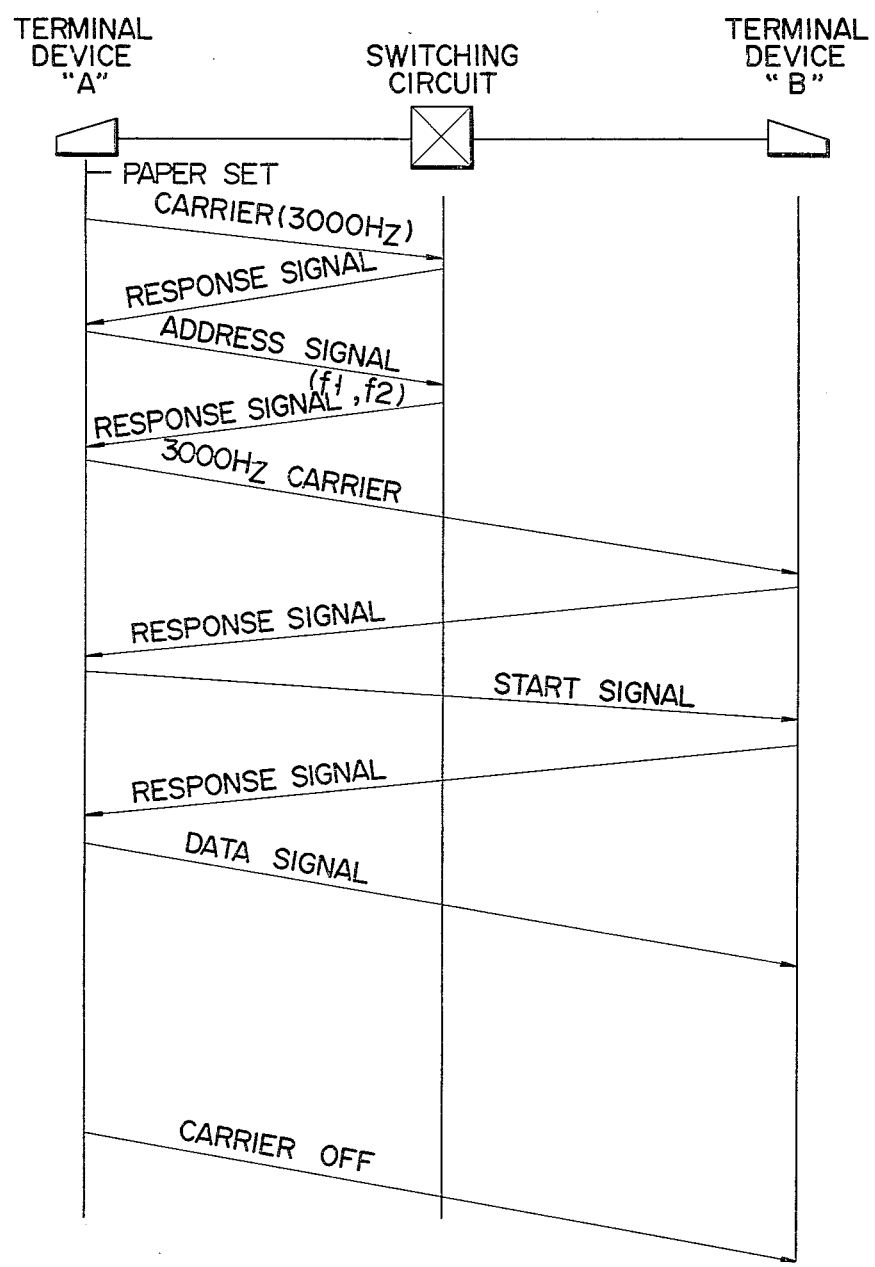
FIG. 10 shows an outline of the operation of the embodiment shown in FIG. 5.

The response signal includes two signal components of a fa signal of (425−35) Hz and a fb signal of (425+35) Hz, namely, the fa signal of 390 Hz and the fb signal of 460 Hz. The response signal is consisted of, for example, eight signal components serially arranged in a prescribed order. The response signal is decoded by a receiver 84 arranged in such a manner as shown in FIG. 9. In FIG. 9, the response signal is first amplified into a sufficient magnitude and then is supplied to band-pass filters 841, 842 having center frequencies 390 Hz and 460 Hz, respectively. Outputs of the filters 841, 842 are rectified at rectifiers 843, 844 and the output of the rectifier 843 is supplied to one input terminal of an AND gate 846 through an inverter 845. The output of the rectifier 844 is supplied to the other input terminal of the AND gate 846. The output of the AND gate 846 is supplied to an input terminal of an I/O(3) device shown in FIG. 7. The 390 Hz bit component of the eight-bit response signal is referred to a logical level "0" and the 460 Hz bit component is logical level "1". Thus, when a 460 Hz signal is sent forth into the amplifier 840, "1" signal is delivered from the AND gate 846, and when a 390 Hz signal is received "0" signal is generated from the AND gate 846. As a result, when a eight-bit response signal is supplied to the I/O(3) device 85, a start signal is sent forth from the CPU 80 to the I/O(2) device 79. The CPU 80, I/O(1) device 81, I/O(2) device 79, I/O(3) device 85 and I/O(4) device 88 are also coupled to a main memory 86. The I/O(4) device 88 receives a carrier (data) signal from the line circuit 25 through the 600–3400 Hz filter 89 and the carrier detector 90 sent forth from another terminal device.

Now, the signal transmission among the terminal devices "A", "B" and the switching circuit 11 is explained in the FIG. 10 to FIG. 13. First, when a paper having an information to be sent is set to the terminal device "A", a call signal, i.e. a 3000 Hz carrier is delivered to the switching circuit 11. Upon receipt of this call signal, the switching circuit 11 detects a terminal device "B" called in such a manner as shown in FIG. 13 to determine whether the regenerative repeater should be connected or not there-between. The terminal devices "A" and "B" are connected with each other through the switching circuit 11 in accordance with the determination.

Referring now to FIG. 13, when to switching network or switching circuit 11 receives a call or a 3000 Hz carrier from the terminal device "A" in a step I, it is checked that whether the originating register (O.R.) 29 is empty or not in a step II. If the originating register 29 is empty, the terminal device "A" and the originating register 29 are connected with each other through the switching circuit 11 in a step III. Then, in a step IV, the terminal device "A" receives an FSK or ACK(1) signal and sends forth from the MF oscillator 76 a terminal device-designating signal (f1, f2) of the terminal device "B" called. The terminal device-designating signal is a frequency-mixed signal including two-frequency signals f1 and f2 as shown in the following table III in which ten terminal devices "A" to "J" have addresses 0 to 9. The frequency f1 is selected from frequencies 1209 Hz, 1336 Hz and 1477 Hz and f2 is selected from frequencies 697 Hz, 770 Hz, 852 Hz and 941 Hz. In this case, the frequencies f1 and f2 of the called terminal device "B" are 1209 Hz and 697 Hz representing the address 1.

Table III

| ADDRESS | f1 (Hz) | f2 (Hz) | TERMINAL DEVICE |
|---|---|---|---|
| 0 | 1336 | 941 | A |
| 1 | 1209 | 697 | B |
| 2 | 1336 | 697 | C |
| 3 | 1477 | 697 | D |
| 4 | 1209 | 770 | E |
| 5 | 1336 | 770 | F |
| 6 | 1477 | 770 | G |
| 7 | 1209 | 852 | H |
| 8 | 1336 | 852 | I |
| 9 | 1477 | 852 | J |

The CPU 27 receives this terminal device-designating signal and determines, in the step VI, whether the regeneration repeater 12 is to be used in a line L connected between the terminal devices "A" and "B" or not in accordance with the stored contents of the RAM 31. If the content of the RAM 31 is "1", the terminal device "A" and the regenerative repeater 12 are connected through the switching circuit 11 in a step VII, then, in a step VIII, the regnerative repeater 12 is connected through the switching circuit 11 to the line L. When the connection of the regenerative repeater 12 is performed, an FSK signal or ACK(2) signal is sent forth to the terminal device "A" in a step IX. If in the step VI, the content of the RAM 31 is "O", the terminal device "A" is connected to the line L through the switching circuit 11 in a step X, and the operation is shifted to the following step IX.

Returning to the FIG. 10, upon receipt of the address signal thus obtained, a response signal or ACK(2) signal is sent forth from the switching circuit 11 to the terminal device "A", and a 3000 Hz carrier signal is delivered from the device "A" to the terminal device "B". When the 3000 Hz carrier signal is supplied to the terminal device "B", a response signal is delivered to the terminal device "A" from the device "B". Upon receipt of the response signal, the device "A" sends forth a start signal to the device "B". The start signal is also a carrier signal. The device "B" sends forth a response signal to the device "A" in response to the start signal, and a data signal, namely, a picture signal of the facsimile is delivered from the device "A" to the device "B". When the sending operation of the data signal is completed, the carrier transmission from devices "A" to "B" is terminated to restore the operation step to the initial state.

Figure 11:
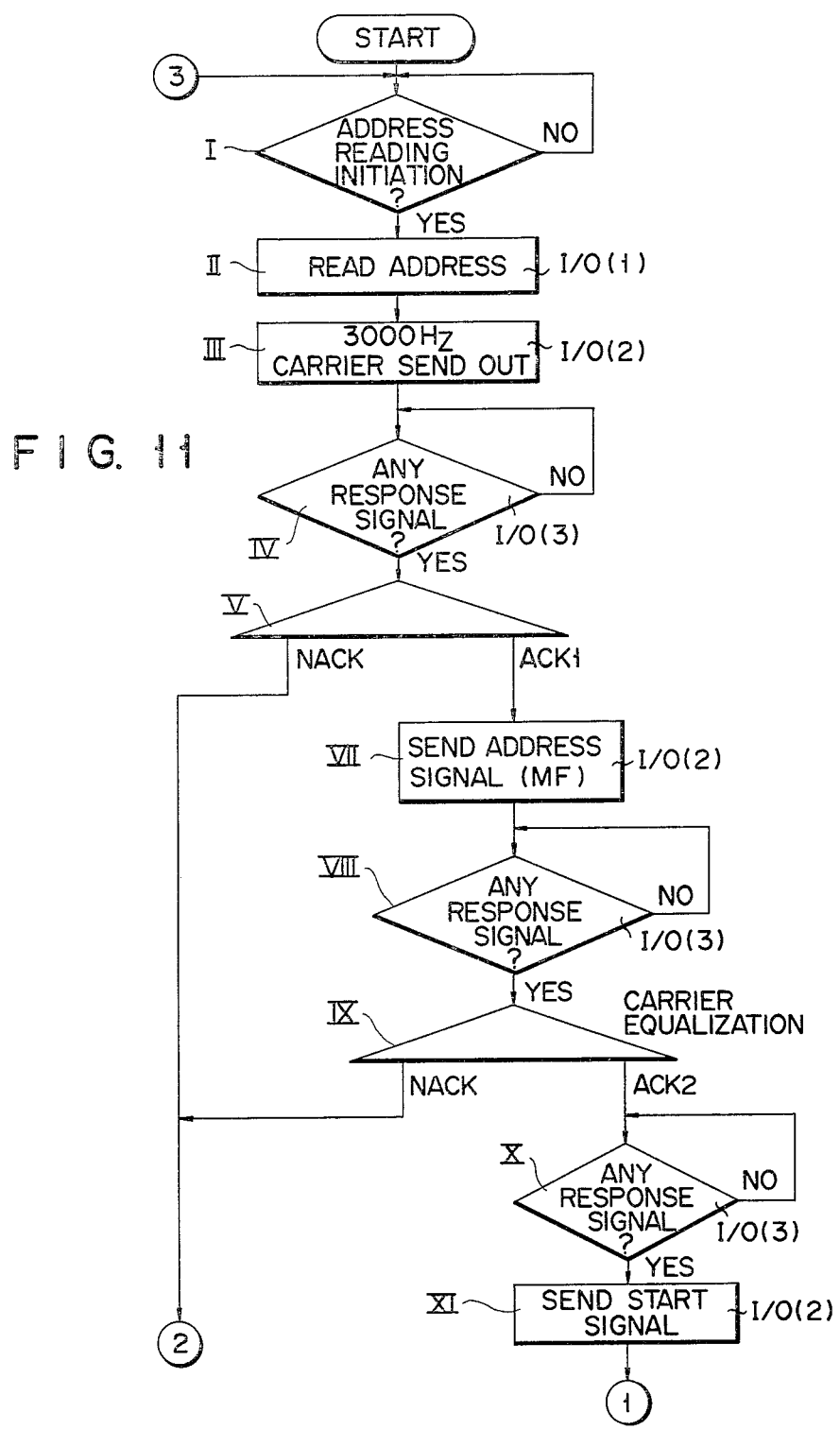
Figure 12:
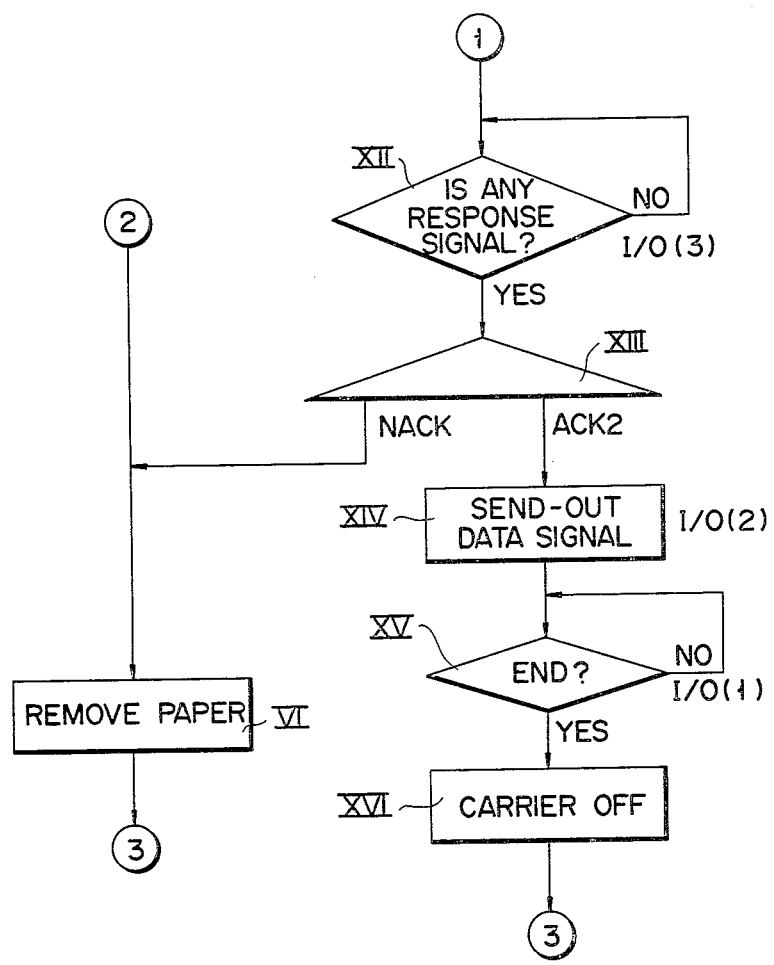

In FIG. 11, as the operation step is initiated, whether the operation state is an initiation of the address reading or not is first checked in a step I. For example, where a paper is set to the terminal device "A", an answer "YES" is obtained at the step I. If this is the case, an address reading circuit 82 is driven by the output of the I/O(1) device 81 in a step II to perform an address reading. Then, a 3000 Hz carrier is delivered from the carrier oscillation circuit 75 under the control of the I/O(2) device 79 in a step III. As a result, whether a response signal (FSK signal) from the line circuit 25 of the switching circuit 19 is received at the I/O(3) device 85 or not is checked in a step IV. When this response signal is an NACK signal in a following step V, the operation is shifted to a step VI in which a paper is removed from the calling terminal device "A". The step is then restored to the step I in FIG. 11. When the response signal is an ACK1 signal in the step V, the MF oscillation circuit 76 is driven by the I/O(2) device 79 in a step VII to send forth an address signal of the terminal device "B". As a result, when a response signal is supplied to the I/O(3) device 85 in a step VIII, whether the response signal is the NACK signal or the ACK2 signal is checked in a step IX. If the NACK signal is detected, the operation for removing the paper is performed in the step VI. If the ACK signal is detected, whether the I/O(3) device 85 has been supplied with a response signal or not is checked in a step X. In the case of being "YES", the I/O(2) device 79 is driven to deliver a transmit or read initiation signal of the facsimile device in a step XI.

When the transmit initiation signal is delivered, the step XII checks whether a response signal is supplied to the I/O(3) device 85 or not. If the result of this check is "YES", a further checking operation whether the response signal is an NACK signal or an ACK2 signal is performed in a step XIII. When the response signal is the NACK signal, the operation is shifted to the step VI, whereas the ACK signal is detected, the I/O(2) device 29 is driven to send forth a picture signal or data signal in a step XIV. The termination of the data signal is detected in the succeeding step XV. As a result, the carrier transmission is ended in a step XVI to restore the operation to the initial step I in FIG. 11.

The above explanation is concerned with a case wherein a data (carrier) is transmitted from the transmitter 51 of the terminal device "A" to the receiver 52 of the terminal device "B" through the switch S1 and a response (ACK) signal is transmitted from the transmitter 54 of the terminal device "B" to the receiver 53 of the terminal device "A" through the switch S4. The receiver 53 of the device "A" receives from the transmitter 56 of the device "C" through the switch S3 a data (carrier) which is separated at the 600 Hz–3400 Hz band-pass filter 89 of FIG. 7 and is detected at the carrier detector 90. The carrier thus sent forth from the device "C" and detected is transferred to the CPU 80 of the device "A" through the I/O(4) device 88. The CPU 80 drives the FSK oscillator 87 and sends forth an FSK signal from the line circuit 25 through the switch S2 to the receiver 55 of the terminal device "C" upon receipt of the data. The terminal device "C" has the same construction as the device "A" shown in FIG. 7 and the FSK signal is detected through circuits arranged in the similar manner as the circuits 83, 84 and 85.

According to this invention the respective terminal devices can transmit a data to another terminal device and also can receive data from the another terminal device or a still another terminal device in the same time.

What we claim is:

1. A switching apparatus comprising:
   a switching circuit provided with a plurality of input terminals and a plurality of output terminals;
   at least one regenerative repeater connected between selected input and output terminals of the switching circuit, the number of the regenerative repeaters provided in the switching apparatus being less than the number of circuits signal paths through which a data signal of high error rate is expected to pass;
   a first signal-conducting means for conducting a call signal supplied from a calling terminal device through said switching circuit to an originating register which interprets a terminal device-designating signal included in said call signal so as to determine a number allotted to a called terminal device;
   random access memory means coupled to said switching circuit and to said originating register for storing a signal denoting a decision with respect to the error rate of a data signal transmitted through each of the signal paths connected between said calling and called terminal devices through said switching circuit, said random access memory means being addressed according to the particular signal path being utilized;
   CPU means coupled to said switching circuit, to said originating register, and to said random access memory means for determining if a regenerative repeater is to be used according to the contents of said random access memory and for issuing a prescribed switching instruction to said switching circuit according to the result of the determination; and
   a second signal-conducting means for conducting a data signal between said calling and called terminal devices through said switching circuit and through said regenerative repeater selectively connected in said second signal-conducting means.

2. The switching apparatus according to claim 1, wherein the calling and called terminal devices are each provided with a transmitter and a receiver; the transmitter sends forth a mixture of a data signal and a control signal; said switching apparatus further comprises a line circuit connected between a calling terminal device and the switching circuit; and said line circuit comprises means for separating the data signal and control signal and conducting both signals to the switching circuit through separate routes.

3. The switching apparatus according to claim 2, wherein the line circuit comprises means for detecting a high frequency carrier signal included in a signal delivered from the transmitter of the calling terminal device; means for conducting the data signal to one route included in the switching circuit; a low-pass filter for extracting a low frequency component of a signal issued from said transmitter; means for extracting the control signal from an output of the low-pass filter; and means for transmitting the control signal to another route included in the switching circuit according to an output from the control signal-extracting means.

4. A switching apparatus according to claim 1, wherein said originating register comprises:
high-pass filter means for extracting a high frequency band of the terminal device designating signal;
low-pass filter means for extracting a low frequency band of the terminal device-designating signal;
a plurality of first band-pass filter means coupled to said high-pass filter means for extracting signals having different central frequencies out of a high frequency band drawn off by said high-pass filter means;
a plurality of second band-pass filter means coupled to said low-pass filter means for extracting signals having different frequencies out of a low frequency band drawn off by said low-pass filter means; and
logic circuit means coupled to said first and second band-pass filter means for obtaining outputs from the first and second band-pass filter means thereby indicating said number allotted to the called terminal device.

5. A switching apparatus according to claim 4, wherein said calling and called terminal devices are each provided with a transmitter and a receiver, said transmitters sending forth a mixture of a data signal and a control signal; said switching apparatus further comprises a line circuit connected between a calling terminal device and the switching circuit; and said line circuit comprises means for separating the data signal and the control signal and conducting both signals to the switching circuit through separate routes.

* * * * *